A. R. HOFFMANN.
FEEDING APPARATUS.
APPLICATION FILED MAY 25, 1911.
1,034,240.
Patented July 30, 1912.
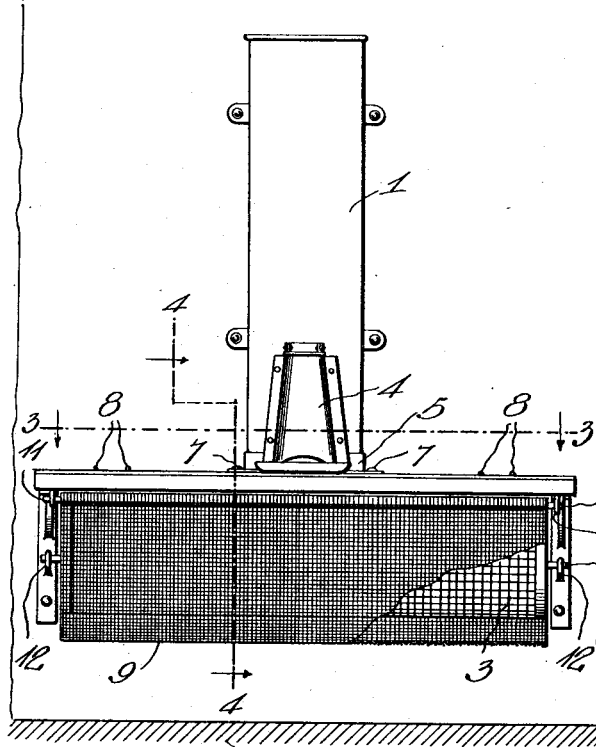
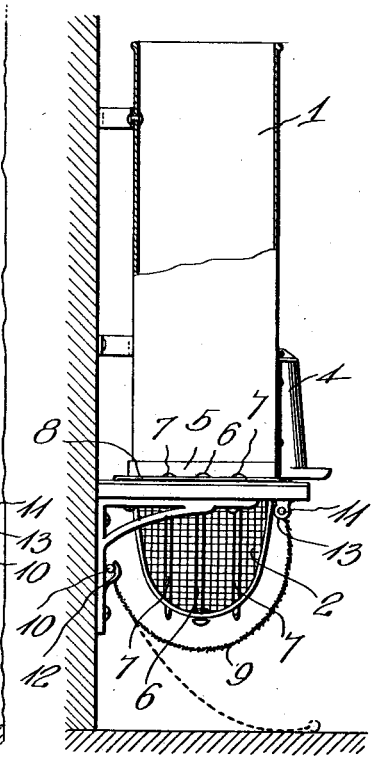
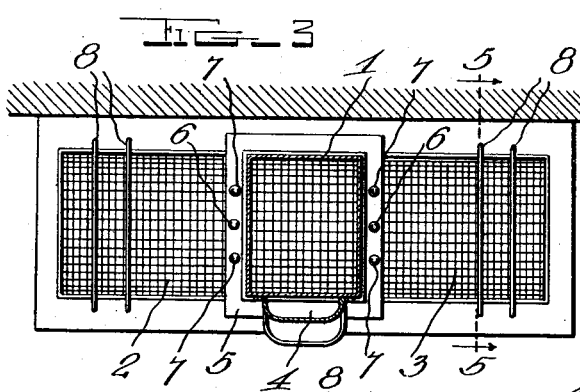
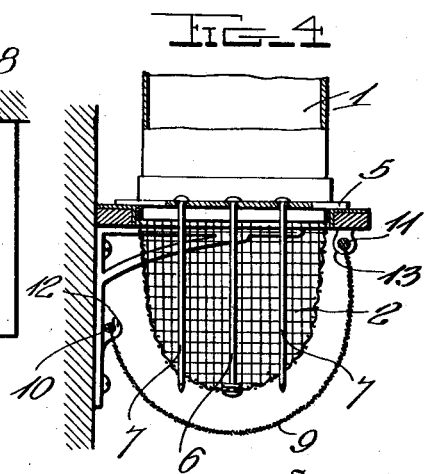
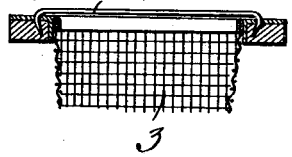
Witnesses
Inventor
A. R. Hoffmann
Attorneys

UNITED STATES PATENT OFFICE.

AUGUST R. HOFFMANN, OF ST. LOUIS, MISSOURI.

FEEDING APPARATUS.

1,034,240.  Specification of Letters Patent.  Patented July 30, 1912.

Application filed May 25, 1911. Serial No. 629,476.

*To all whom it may concern:*

Be it known that I, AUGUST R. HOFFMANN, a citizen of the United States, residing at St. Louis, in the State of Missouri, have invented certain new and useful Improvements in Feeding Apparatus; and I do declare the following to be a full, clear, and exact description of the invention, such as will enable others skilled in the art to which it appertains to make and use the same.

This invention relates to improvements in feeding apparatus especially designed for feeding long food to horses or other animals, and is designed to be used in connection with a suitable grain-supply apparatus shown and described in my companion application filed on even date herewith, Serial No. 629,475.

The principal object of the invention is to provide a hay-rack or feed-bin from which the animal may draw his own food supply, and which is equipped with waste-preventing means whereby a limited supply may be drawn out at one time by the animal and its overthrow from the feed trough or manger prevented.

Another object is to provide a thoroughly ventilated manger for aerating food therein and furnishing sufficient air to permit the animal to eat from the manger without raising his head.

Another object is to provide a manger having means to permit the dust and chaff to be sifted from the food onto a removable screen of fine mesh which retains the larger edible products and allows dust to pass therethrough.

With these and other objects in view, the invention consists of certain novel features of construction, combination and arrangement of parts as will be more fully described and particularly pointed out in the appended claims.

In the accompanying drawings: Figure 1 represents a front elevation partly in section of the feeding apparatus constructed in accordance with this invention; Fig. 2 is an end elevation thereof with the feed-bin partly in section; Fig. 3 is a horizontal section taken on the line 3—3 of Fig. 1, looking in the direction of the arrows; Fig. 4 is a vertical transverse section taken on the line 4—4 of Fig. 1, and Fig. 5 is a detail vertical section taken on the line 5—5 of Fig. 3.

In the embodiment illustrated, a bin 1 is shown for containing hay or similar food, which is mounted between two stalls at the head thereof, and is adapted to receive its supply from a loft or room above, a hopper, or from any other suitable source. The lower end of this bin 1 extends over the adjacent ends of two mangers 2 and 3 which are arranged in longitudinal alinement, the upper edges of which are flush with the lower end of said bin, said bin extending across the mangers and being secured thereto by bolts or any other suitable means.

A box 4 for salt or any other feed is preferably secured to the front wall of the bin 1 and may be of any suitable or desired construction. This bin 1 is preferably provided at its lower end with a laterally-extending flange 5 which extends around the bin and which is adapted for use in connecting the bin to the manger.

Guard rods, as 6, extend through the flanges 5 at the sides of the bin and have their lower ends engaged with the bottoms of the mangers 2 and 3 and thus serve as an auxiliary support for the mangers as well as guards to prevent the animal from drawing out more food into the manger than he can readily consume. A plurality of removable guard rods, as 7, also extend through the side flanges of the bin and have their lower ends detachably engaged with the bottoms of the mangers to provide for their being readily inserted and removed when desired, said rods being designed to regulate the supply which the animal is permitted to draw from the bin. Rods, as 8, are arranged transversely across the mangers at the ends opposite the bin, and are spaced any suitable or desired distance apart, being designed to prevent hay or other food drawn into the manger from being accidentally thrown over the upper edge of the manger and wasted. These rods, as shown, are provided with right-angularly extending terminals, which are preferably pointed to facilitate their insertion in apertures formed in the upper edges of the sides of the mangers, said ends being preferably bent slightly inward to cause them to yieldably engage the walls of the apertures in which they are inserted to prevent their accidental disengagement from the manger, and, yet, permit them to be removed when it is desired to clean the manger or for other reasons. These mangers 2 and 3 are constructed of foraminous material, preferably of wide mesh screen wire, the edges of which are secured in any suitable manner to the supporting framework, which is here shown rectangular in form and the mangers or food troughs as U-shaped in cross-section, but it is to be understood that they may be made in any other desired shape. The ends of these mangers are also covered with similar foraminous material, which permits a free circulation of air through the mangers and the food contained therein and thus thoroughly ventilates the food and supplies air for breathing purposes to the horses or other animals during the consumption of the food without necessitating the lifting of their heads when eating.

Arranged below the mangers 2 and 3 and spaced therefrom a suitable distance, is an auxiliary trough 9 of fine mesh wire, which is adapted to catch the larger particles sifted through the foraminous mangers and retain them while permitting the dust to pass therethrough whereby the edible portions of the material sifted from the mangers are retained and, when desired or necessary, this member 9 may be disengaged from the front of the manger and the edible material contained thereon removed and returned to the manger. This trough 9 is preferably constructed from a rectangular strip of fine mesh wire, or other suitable fabric, and is provided at its opposite side edges with reinforcing rods 10 and 11, the ends of which project beyond the ends of the strip and are adapted to be engaged with suitable supports mounted on the frame of the manger, the ends of the rod 10 at the rear of the strip being engaged with hook-shaped members 12, while the ends of the front rod 11 are engaged with depending eyes 13 secured to the front rail of the manger support, as shown clearly in Figs. 2 and 4.

When it is desired to remove the contents of the screen member 9, it is only necessary to slide the rod 11 longitudinally to disengage the ends thereof from the eyes 13 when the front edge of said member may be lowered into the position shown in dotted lines in Fig. 2 and the contents removed. When it is desired to clean the mangers the removable vertically-disposed rods 7 are lifted out and the rods 8 are also removed, when a suitable implement may be inserted for brushing or otherwise cleaning the mangers, the permanent rods 6 offering very little obstruction to the cleaning operation.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim is:—

1. A manger having a perforated bottom, and an auxiliary foraminous trough arranged below it and spaced therefrom, and conforming substantially to the shape thereof one side of said auxiliary trough being detachably supported.

2. A supporting structure, a feed trough or manger secured thereto and having a perforated bottom, an auxiliary trough arranged below said feed trough and composed of a strip of foraminous flexible material, reinforcing rods secured to the side edges of said strip with their ends beyond the ends of said strip and means on said structure for detachable engagement by said rod ends.

In testimony whereof I have hereunto set my hand in presence of two subscribing witnesses.

AUGUST R. HOFFMANN.

Witnesses:
 JAMES H. LEWIS,
 L. O. HILTON.

---

Copies of this patent may be obtained for five cents each, by addressing the "Commissioner of Patents, Washington, D. C."